United States Patent
Liu et al.

(10) Patent No.: US 12,356,454 B2
(45) Date of Patent: Jul. 8, 2025

(54) HARQ FEEDBACK FOR NR SIDELINK COMMUNICATION IN UNLICENSED SPECTRUM

(71) Applicant: NOKIA TECHNOLOGIES OY, Espoo (FI)

(72) Inventors: Yong Liu, Shanghai (CN); Tao Tao, Shanghai (CN); Dong Li, Shanghai (CN)

(73) Assignee: NOKIA TECHNOLOGIES OY, Espoo (FI)

( * ) Notice: Subject to any disclaimer, the term of this patent is extended or adjusted under 35 U.S.C. 154(b) by 264 days.

(21) Appl. No.: 18/028,653

(22) PCT Filed: Oct. 9, 2020

(86) PCT No.: PCT/CN2020/120047
§ 371 (c)(1),
(2) Date: Mar. 27, 2023

(87) PCT Pub. No.: WO2022/073214
PCT Pub. Date: Apr. 14, 2022

(65) Prior Publication Data
US 2023/0371073 A1 Nov. 16, 2023

(51) Int. Cl.
*H04W 74/08* (2024.01)
*H04W 74/0816* (2024.01)

(52) U.S. Cl.
CPC ... *H04W 74/0816* (2013.01); *H04W 74/0866* (2013.01)

(58) Field of Classification Search
None
See application file for complete search history.

(56) References Cited

U.S. PATENT DOCUMENTS

2018/0359072 A1 12/2018 Tiirola et al.
2020/0037343 A1 1/2020 He et al.
(Continued)

FOREIGN PATENT DOCUMENTS

CN 111327405 A 6/2020
CN 111342941 A 6/2020
(Continued)

OTHER PUBLICATIONS

OPPO, "Remaining issues of physical layer procedure for NR-V2X," Agenda item 7.2.4.5, 3GPP TSG RAN WG1 #100 e-Meeting, Feb. 24-Mar. 6, 2020, R1-2000492, pp. 1-11 (Year: 2020).*
(Continued)

*Primary Examiner* — Benjamin Lamont
(74) *Attorney, Agent, or Firm* — Robert P. Michal, Esq.; Carter, DeLuca & Farrell LLP

(57) ABSTRACT

Embodiments of the present disclosure relate to devices, methods, apparatuses and computer readable storage media of HARQ for NR sidelink communication in unlicensed spectrum. The method comprises receiving, from a second device, an indication of at least two candidate sets of code domain resources for the first device to transmit a feedback message for a sidelink transmission between the first device and a third device; and transmitting, to the third device, the feedback message on a target set of code domain resources determined from the at least two candidate sets of code domain resources based on a listen before talk procedure. In this way, additional code domain resources may provide more available time occasions as backup resources for HARQ feedback of sidelink transmission in unlicensed band, which may increase reliability of HARQ feedback transmission for sidelink communication in unlicensed spectrum. Hence it can eventually increase spectral efficiency by (Continued)

avoiding unnecessary retransmission of PSCCH/PSSCH, and can also reduce transmission latency in the meantime.

1 Claim, 4 Drawing Sheets

(56) References Cited

U.S. PATENT DOCUMENTS

| | | | | |
|---|---|---|---|---|
| 2020/0205196 | A1* | 6/2020 | Novlan | H04W 74/0808 |
| 2020/0220669 | A1* | 7/2020 | Park | H04L 1/1861 |
| 2020/0288286 | A1* | 9/2020 | Hwang | H04L 27/2607 |
| 2021/0288778 | A1 | 9/2021 | Park | |
| 2021/0314921 | A1* | 10/2021 | Yang | H04W 72/02 |
| 2022/0116996 | A1* | 4/2022 | Lee | H04W 74/0816 |
| 2022/0191833 | A1* | 6/2022 | Qu | H04W 72/02 |
| 2023/0276490 | A1* | 8/2023 | Wu | H04L 1/1861 |
| | | | | 370/329 |

FOREIGN PATENT DOCUMENTS

| | | |
|---|---|---|
| CN | 111416700 A | 7/2020 |
| EP | 3920452 B1 | 8/2023 |
| KR | 20200034924 A | 4/2020 |
| KR | 20200050848 A | 5/2020 |
| WO | 2019160767 A1 | 8/2019 |
| WO | 2020/125558 A1 | 6/2020 |
| WO | 2020145723 A1 | 7/2020 |
| WO | 2020180032 A1 | 9/2020 |
| WO | 2020/192425 A1 | 10/2020 |

OTHER PUBLICATIONS

Anonymous, "3rd Generation Partnership Project; Technical Specification Group Radio Access Network; NR; Radio Resource Control (RRC) protocol specification (Release 16)", 3GPP TS 38.331, V16.0.0, Mar. 2020, pp. 1-835.

Anonymous, "3rd Generation Partnership Project; Technical Specification Group Radio Access Network; NR; Physical layer procedures for data (Release 16)", 3GPP TS 38.214, V16.2.0, Jun. 2020, pp. 1-163.

Anonymous, "3rd Generation Partnership Project; Technical Specification Group Radio Access Network; NR; Multiplexing and channel coding (Release 16)", 3GPP TS 38.212, V16.2.0, Jun. 2020, pp. 1-151.

Anonymous, "5 GHz RLAN; Harmonised Standard covering the essential requirements of article 3.2 of Directive 2014/53/EU", ETSI EN 301 893, V2.1.1, May 2017, pp. 1-122.

Anonymous, IEEE 802.11, Wikipedia, Retrieved on Jul. 15, 2024, Webpage available at : https://en.wikipedia.org/wiki/IEEE_802.11, 18 pages.

Anonymous, "3rd Generation Partnership Project; Technical Specification Group Radio Access Network; Physical layer procedures for shared spectrum channel access (Release 16)", 3GPP TS 37.213, V16.2.0, Jun. 2020, pp. 1-26.

Extended European Search Report received for corresponding European Patent Application No. 20956529.0, dated Jun. 5, 2024, 7 pages.

Office action received for corresponding Chinese Patent Application No. 202080106008.X, Jun. 27, 2024 (13 pages), and English Translation (13 pages), total 26 pages.

International Search Report and Written Opinion dated Jun. 24, 2021 corresponding to International Patent Application No. PCT/CN2020/120047.

Sharp, "Physical layer procedures for NR sidelink," 3GPP Draft; R1-1912761, 3GPP TSG RAN WG1 Meeting #99, Reno, USA, Nov. 18-22, 2019.

Office Action received for corresponding Chinese Patent Application No. 202080106008.X, dated Nov. 30, 2024, 14 pages of Office Action and no page of translation available.

Office Action received for corresponding Chinese Patent Application No. 202080106008.X, dated Mar. 1, 2025, 10 pages of office action and no page of translation available.

* cited by examiner

HARQ FEEDBACK FOR NR SIDELINK COMMUNICATION IN UNLICENSED SPECTRUM

FIELD

Embodiments of the present disclosure generally relate to the field of telecommunication and in particular to devices, methods, apparatuses and computer readable storage media of Hybrid Automatic Repeat Request (HARQ) for New Radio (NR) sidelink communication in unlicensed spectrum

BACKGROUND

In Release 16, Physical Sidelink Feedback Channel (PSFCH) for sidelink communication was specified to carry HARQ feedback over the sidelink from a User Equipment (UE) which is an intended recipient of a Physical Sidelink Shared Channel (PSSCH) transmission to the UE which performed the transmission. The time resources for PSFCH are (pre-)configured. The HARQ feedback resource can be derived from the resource location of Physical Sidelink Control Channel (PSCCH)/PSSCH.

Support for NR-based access to unlicensed spectrum (NR-U) was also introduced in Release 16. The NR operation in unlicensed bands relies on the transmitting device sensing the radio resources before commencing transmission. This technique is known as Listen Before Talk (LBT). Different types of LBT procedures, such as Type 1 LBT, Type 2A/2B LBT and Type 2C LBT, have been defined for NR-based access to unlicensed spectrum.

SUMMARY

In general, example embodiments of the present disclosure provide a solution of HARQ for NR sidelink communication in unlicensed spectrum.

In a first aspect, there is provided a first device. The first device comprises at least one processor; and at least one memory including computer program codes; the at least one memory and the computer program codes are configured to, with the at least one processor, cause the first device at least to receive, from a second device, an indication of at least two candidate sets of code domain resources for the first device to transmit a feedback message for a sidelink transmission between the first device and a third device; and transmit, to the third device, the feedback message on a target set of code domain resources determined from the at least two candidate sets of code domain resources based on a listen before talk procedure.

In a second aspect, there is provided a second device. The second device comprises at least one processor; and at least one memory including computer program codes; the at least one memory and the computer program codes are configured to, with the at least one processor, cause the second device at least to generate an indication of at least two candidate sets of code domain resources for a first device to transmit a feedback message for a sidelink transmission between the first device and a third device; and transmit the indication to the first device and the third device.

In a third aspect, there is provided a third device. The third device comprises at least one processor; and at least one memory including computer program codes; the at least one memory and the computer program codes are configured to, with the at least one processor, cause the third device at least to receive, from a second device, an indication of at least two candidate sets of code domain resources for a first device to transmit a feedback message for a sidelink transmission between the first device and the third device; and receive, from the first device, the feedback message on a target set of code domain resources determined by the first device from the at least candidate two sets of code domain resources based on a listen before talk procedure.

In a fourth aspect, there is provided a method. The method comprises receiving, from a second device, an indication of at least two candidate sets of code domain resources for the first device to transmit a feedback message for a sidelink transmission between the first device and a third device; and transmitting, to the third device, the feedback message on a target set of code domain resources determined from the at least two candidate sets of code domain resources based on a listen before talk procedure.

In a fifth aspect, there is provided a method. The method comprises generating an indication of at least two candidate sets of code domain resources for a first device to transmit a feedback message for a sidelink transmission between the first device and a third device; and transmitting the indication to the first device and the third device.

In a sixth aspect, there is provided a method. The method comprise receiving, from a second device, an indication of at least two candidate sets of code domain resources for a first device to transmit a feedback message for a sidelink transmission between the first device and the third device; and receiving, from the first device, the feedback message on a target set of code domain resources determined by the first device from the at least candidate two sets of code domain resources based on a listen before talk procedure.

In a seventh aspect, there is provided an apparatus comprising means for receiving, from a second device, an indication of at least two candidate sets of code domain resources for the first device to transmit a feedback message for a sidelink transmission between the first device and a third device; and means for transmitting, to the third device, the feedback message on a target set of code domain resources determined from the at least two candidate sets of code domain resources based on a listen before talk procedure.

In an eighth aspect, there is provided an apparatus comprising means for generating an indication of at least two candidate sets of code domain resources for a first device to transmit a feedback message for a sidelink transmission between the first device and a third device; and means for transmitting the indication to the first device and the third device.

In a ninth aspect, there is provided an apparatus comprising means for receiving, from a second device, an indication of at least two candidate sets of code domain resources for a first device to transmit a feedback message for a sidelink transmission between the first device and the third device; and means for receiving, from the first device, the feedback message on a target set of code domain resources determined by the first device from the at least candidate two sets of code domain resources based on a listen before talk procedure.

In a tenth aspect, there is provided a computer readable medium having a computer program stored thereon which, when executed by at least one processor of a device, causes the device to carry out the method according to the fourth aspect.

In an eleventh aspect, there is provided a computer readable medium having a computer program stored thereon which, when executed by at least one processor of a device, causes the device to carry out the method according to the fifth aspect.

In a twelfth aspect, there is provided a computer readable medium having a computer program stored thereon which, when executed by at least one processor of a device, causes the device to carry out the method according to the sixth aspect.

Other features and advantages of the embodiments of the present disclosure will also be apparent from the following description of specific embodiments when read in conjunction with the accompanying drawings, which illustrate, by way of example, the principles of embodiments of the disclosure.

BRIEF DESCRIPTION OF THE DRAWINGS

Embodiments of the disclosure are presented in the sense of examples and their advantages are explained in greater detail below, with reference to the accompanying drawings, where.

Throughout the drawings, the same or similar reference numerals represent the same or similar element.

DETAILED DESCRIPTION

Figure 1:
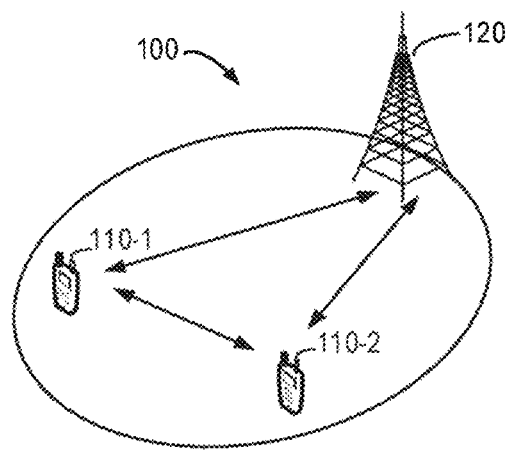
FIG. 1 illustrates an example environment in which example embodiments of the present disclosure can be implemented.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an example embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish functionalities of various elements. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:
(a) hardware-only circuit implementations (such as implementations in only analog and/or digital circuitry) and
(b) combinations of hardware circuits and software, such as (as applicable):
  (i) a combination of analog and/or digital hardware circuit(s) with software/firmware and
  (ii) any portions of hardware processor(s) with software (including digital signal processor(s)), software, and memory(ies) that work together to cause an apparatus, such as a mobile phone or server, to perform various functions) and
(c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as fifth generation (5G) systems, Long Term Evolution (LTE), LTE-Advanced (LTE-A), Wideband Code Division Multiple Access (WCDMA), High-Speed Packet Access (HSPA), Narrow Band Internet of Things (NB-IoT) and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the future fifth generation (5G) new radio (NR) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), a NR Next Generation NodeB (gNB), a Remote Radio Unit (RRU), a radio header (RH), a remote radio head (RRH), a relay, a low power node such as a femto, a pico, and so forth, depending on the applied terminology and technology. A RAN split architecture comprises a gNB-CU (Centralized unit, hosting RRC, SDAP and PDCP) controlling a plurality of gNB-DUs (Distributed unit, hosting RLC, MAC and PHY). A relay node may correspond to DU part of the IAB node.

The term "terminal device" refers to any end device that may be capable of wireless communication. By way of example rather than limitation, a terminal device may also be referred to as a communication device, user equipment (UE), a subscriber station (SS), a portable subscriber station, a mobile station (MS), or an access terminal (AT). The terminal device may include, but not limited to, a mobile phone, a cellular phone, a smart phone, voice over IP (VoIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. The terminal device may also correspond to Mobile Termination (MT) part of the integrated access and backhaul (IAB) node (a.k.a. a relay node). In the following description, the terms "terminal device", "communication device", "terminal", "user equipment" and "UE" may be used interchangeably.

Although functionalities described herein can be performed, in various example embodiments, in a fixed and/or a wireless network node, in other example embodiments, functionalities may be implemented in a user equipment apparatus (such as a cell phone or tablet computer or laptop computer or desktop computer or mobile IoT device or fixed IoT device). This user equipment apparatus can, for example, be furnished with corresponding capabilities as described in connection with the fixed and/or the wireless network node(s), as appropriate. The user equipment apparatus may be the user equipment and/or or a control device, such as a chipset or processor, configured to control the user equipment when installed therein. Examples of such functionalities include the bootstrapping server function and/or the home subscriber server, which may be implemented in the user equipment apparatus by providing the user equipment apparatus with software configured to cause the user equipment apparatus to perform from the point of view of these functions/nodes.

FIG. 1 shows an example communication network 100 in which embodiments of the present disclosure can be implemented. As shown in FIG. 1, the communication network 100 includes a terminal device 110-1 (hereinafter may also be referred to as a UE 110-1 or a first device 110-1) and a further terminal device 110-2 (hereinafter may also be referred to as a further UE 110-2 or a third device 110-2). The communication network 100 may comprise a network device 120 (hereinafter may also be referred to as a gNB 120 or a second device 120). The network device 120 may communicate with the terminal devices 110-1 and 110-2. The terminal devices 110-1 and 110-2 may communicate with each other. It is to be understood that the number of terminal devices and network devices are only for the purpose of illustration without suggesting any limitations. The communication network 100 may include any suitable number of terminal devices adapted for implementing embodiments of the present disclosure.

The communication network 100 can be implemented in a scenario of SL communication. In SL communication, the communication between terminal devices (for example, V2V, V2P, V2I communications) can be performed via sidelinks. For SL communication, information may be transmitted from a Transmit (TX) terminal device to one or more Receive (RX) terminal devices in a broadcast, or groupcast, or unicast manner.

Depending on the communication technologies, the network 100 may be a Code Division Multiple Access (CDMA) network, a Time Division Multiple Address (TDMA) network, a Frequency Division Multiple Access (FDMA) network, an Orthogonal Frequency-Division Multiple Access (OFDMA) network, a Single Carrier-Frequency Division Multiple Access (SC-FDMA) network or any others. Communications discussed in the network 100 may conform to any suitable standards including, but not limited to, New Radio Access (NR), Long Term Evolution (LTE), LTE-Evolution, LTE-Advanced (LTE-A), Wideband Code Division Multiple Access (WCDMA), Code Division Multiple Access (CDMA), cdma2000, and Global System for Mobile Communications (GSM) and the like. Furthermore, the communications may be performed according to any generation communication protocols either currently known or to be developed in the future. Examples of the communication protocols include, but not limited to, the first generation (1G), the second generation (2G), 2.5G, 2.75G, the third generation (3G), the fourth generation (4G), 4.5G, the fifth generation (5G) communication protocols. The techniques described herein may be used for the wireless networks and radio technologies mentioned above as well as other wireless networks and radio technologies. For clarity, certain aspects of the techniques are described below for LTE, and LTE terminology is used in much of the description below.

PSFCH for sidelink communication was specified to carry HARQ feedback over the sidelink from a receiving UE (Rx UE) to a transmitting UE (Tx UE) which performed a PSSCH transmission. For example, the PSFCH may transmit a Zadoff-Chu sequence in one PRB repeated over two OFDM symbols, the first of which can be used for Automatic Gain Control (AGC), near the end of the sidelink resource in a slot. The Zadoff-Chu sequence as base sequence is (pre-)configured per sidelink resource pool.

The time resources for PSFCH are (pre-)configured. The HARQ feedback resource can be derived from the resource location of PSCCH/PSSCH. For PSSCH-to-HARQ timing, the gNB may configure a parameter K with the unit of slot. The time occasion for PSFCH is determined from K. For a PSSCH transmission with its last symbol in slot n, HARQ feedback is in slot n+a where a is the smallest integer larger than or equal to K with the condition that slot n+a contains PSFCH resources. Furthermore, PSFCH resources used for HARQ feedback of PSSCH transmissions with the same starting sub-channel in different slots are FDMed.

In sub-7 GHz unlicensed bands (U-bands), the NR coexistence with other systems is ensured via a Listen Before Talking (LBT) channel access mechanism. Therefore, a UE intending to perform a SL transmission in a U-band needs first to successfully complete an LBT check before SL transmission is initiated.

To passing an LBT check, it should be determined if the channel is available for a number of consecutive Clear Channel Assessment (CCA) slots. In sub-7 GHz U-band, the duration of these slots is 9 µs. The UE may determine that the channel is available in a CCA slot if the measured power (i.e. the collected energy during the CCA slot) is below a specified threshold.

In unlicensed spectrum there are two types of shared channel access mechanisms, namely a Load Based Equipment (LBE) and a Frame Based Equipment (FBE). For LBE, when a UE initiates the communication, the UE may acquire the "right" to access the channel for a certain time period of, which may be referred to as the Channel Occupancy Time (COT), by applying an "extended" LBT procedure in which the channel can be considered as free on the entire duration of a Contention Window (CW). This "extended" LBT procedure is commonly known as LBT Category 4 (LBT Cat. 4) or LBT Type 1. The duration of both the COT and CW depends on the Channel Access Priority Class (CAPC) associated with the UE's traffic shown as below.

TABLE 1

Channel Access Priority Class (CAPC) for UL

| Channel Access Priority Class (p) | $m_p$ | $CW_{min,p}$ | $CW_{max,p}$ | $T_{ulm\ cot,p}$ | allowed $CW_p$ sizes |
|---|---|---|---|---|---|
| 1 | 2 | 3 | 7 | 2 ms | {3, 7} |
| 2 | 2 | 7 | 15 | 4 ms | {7, 15} |
| 3 | 3 | 15 | 1023 | 6 ms or 10 ms | {15, 31, 63, 127, 255, 511, 1023} |
| 4 | 7 | 15 | 1023 | 6 ms or 10 ms | {15, 31, 63, 127, 255, 511, 1023} |

NOTE1:
For p = 3, 4, $T_{ulm\ cot,p}$ = 10 ms if the higher layer parameter absenceOfAnyOtherTechnology-r14 or absenceOfAnyOtherTechnology-r16 is provided, otherwise, $T_{ulm\ cot,p}$ = 6 ms.

NOTE 2:
When $T_{ulm\ cot,p}$ = 6 ms it may be increased to 8 ms by inserting one or more gaps. The minimum duration of a gap shall be 100 us. The maximum duration before including any such gap shall be 6 ms.

If the LBT Type 1 (LBT Cat. 4) is successfully complete, the UE may perform a transmission and acquire the COT with duration associated with the corresponding CAPC. The acquired COT may be valid even in a case where the initiating device pauses its transmission. If the initiating device intends to perform a new transmission (within the COT), it is still required to perform a "reduced" LBT procedure. This "reduced" LBT procedure is commonly known as LBT Category 2 (LBT Cat. 2) or LBT Category 1 (LBT Cat. 1), which may also be referred to as LBT Type 2. The LBT Type 2 may refer to different variants such as LBT Type 2A, LBT Type 2B and LBT Type 2C.

The initiating device may share its acquired COT with its receiving device (the responding device). For this purpose, the initiating device must inform explicitly (i.e. via control signaling) the responding device about the duration of this COT. The responding device may use this information to determine which category/type of LBT should be applied for performing a transmission to the initiating device. In case either the transmission from the responding device falls outside the COT or the responding device intends to perform a transmission to a device other than the initiating device, the responding device may have to acquire a new COT using the LBT Type 1 (LBT Cat. 4) with the appropriate CAPC.

In the FBE, the channel access procedure is different from the one of LBE. In FBE, A UUT (unit under test) performs a LBT to acquire the channel for a COT during a clear channel assessment (CCA) interval per a fixed frame period in range of 1 ms to 10 ms. The COT may occupy 95% of the fixed frame period while maintain the idle period for at least 100 us. In case LBT in CCA finds the channel occupied, there is no transmissions on the channel during the next fixed frame period.

For continuous transmissions during the COT in which no LBT procedure is required, the gap between two transmissions should be less than 16 us. In case the gap exceeds 16 us, the transmitting device may continue transmissions in this COT if an additional LBT detects no radio local area network (RLAN) transmissions with a level above a predefined threshold. The additional LBT is performed within the gap and within the observation slot immediately before transmission, which may be counted for within the current COT.

In unlicensed spectrum, channel access relies on LBT to ensure fair coexistence of different wireless communication systems. LBT uncertainty in unlicensed spectrum may substantially reduce efficiency of sidelink communication. Reliable transmission of PSFCH is critical because retransmission of PSSCH consumes much more resources than PSFCH. While a PSSCH occupies multiple PRBs (typically more than 10 PRBs) and most OFDM symbols of a slot, a PSFCH only occupies one PRB and 2 OFDM symbols of a slot. In unlicensed spectrum, PSFCH transmission may not be initiated due to LBT failure. This will lead to retransmission of PSSCH consuming substantially more resources.

Therefore, the present disclosure provides solutions of HARQ for NR sidelink communication in unlicensed spectrum. In this solution, at least two sets of code domain resources are (pre-)configured from gNB to Rx UE/Tx UE for sidelink ACK/NACK feedback. When the Rx UE initiates a sidelink ACK/NACK feedback transmission on the PSFCH, the Rx UE may determine a transmission occasion for transmitting the sidelink ACK/NACK feedback message based on the preconfigured at least two sets of code domain resources. In this way, additional code domain resources may provide more available time occasions as backup resources for HARQ feedback of sidelink transmission in unlicensed band, which may increase reliability of HARQ feedback transmission for sidelink communication in unlicensed spectrum. Hence it can eventually increase spectral efficiency by avoiding unnecessary retransmission of PSCCH/PSSCH, and can also reduce transmission latency in the meantime.

Principle and implementations of the present disclosure will be described in detail below with reference to FIG. 2, which show a schematic process of HARQ for NR sidelink communication in unlicensed spectrum. For the purpose of discussion, the process 200 will be described with reference to FIG. 1. The process 200 may involve the UE 110-1, the gNB 120 and the further UE 110-2 as illustrated in FIG. 1.

Figure 2:
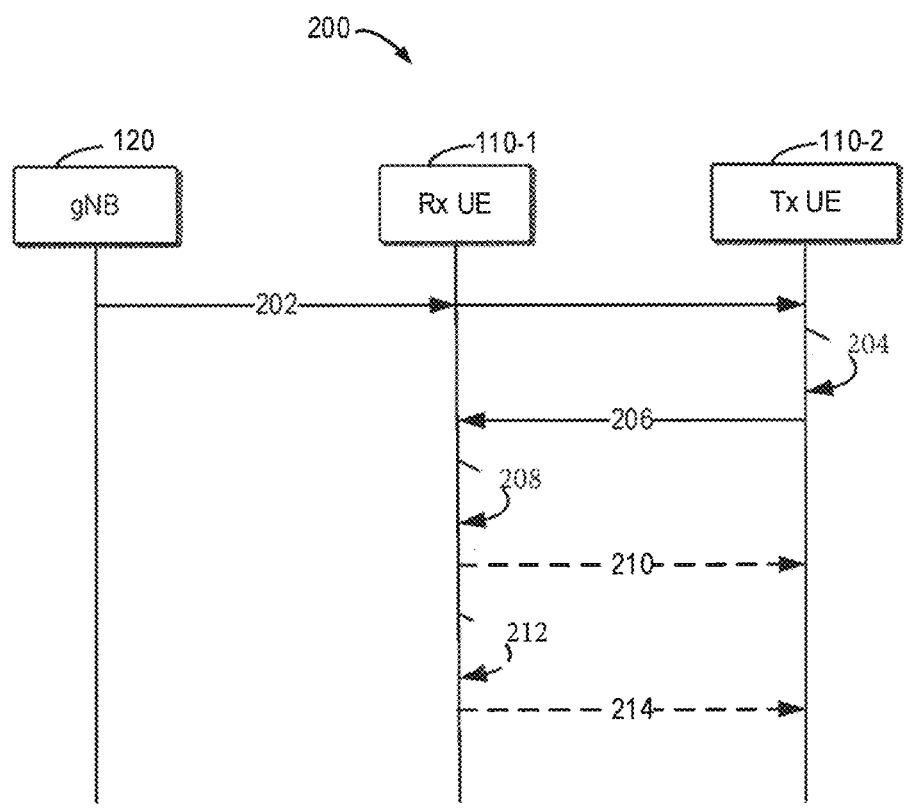
FIG. 2 shows a signaling chart illustrating a process of HARQ for NR sidelink communication in unlicensed spectrum according to some example embodiments of the present disclosure.

As shown in FIG. 2, the gNB 120 may configure at least two set of code domain resources for sidelink ACK/NACK feedback transmission between sidelink UEs, for example, the UEs 110-1 and 110-2.

In some example embodiments, the at least two code domain resources may be realized by employing different cyclic shifts of a base sequence. For example, the base sequence may comprise a Zadoff-Chu sequence.

Assuming that a Zadoff-Chu sequence of length L is employed for PSFCH and N cyclic shifts are configured as a set of code domain resources. For the first set of code domain resources in the at least two code domain resources, cyclic shift set {0, L/N, 2L/N, . . . , (N−1)L/N} with distance L/N can be configured. For the second set of code domain resources in the at least two code domain resources, cyclic shift set {0+L/2N, L/N+L/2N, (N−1)L/N+L/2N} with distance L/N can be configured.

For example, a PSFCH occupies one PRB, i.e. L=12. The gNB 120 may configure cyclic shifts {0, 6} as the first set of code domain resources with ACK using cyclic shift 0 and NACK using cyclic shift 6. The gNB 120 may configure cyclic shifts {3, 9} as the second set of code domain resources with ACK using cyclic shift 3 and NACK using cyclic shift 9.

The gNB 120 may transmit 202 the indication of at least two set of code domain resources to the UEs 110-1 and 110-2, respectively. In this case, the UE 110-1 can be considered as the receiving UE of a sidelink transmission and the UE 110-2 can be considered as the transmitting UE of the sidelink transmission. The sidelink ACK/NACK feedback message is to be transmitted from the UE 110-1 to the UE 110-2.

Then the UE 110-2 may select 204 resources for a sidelink transmission and perform 206 the sidelink transmission to the UE 110-1 on the PSCCH/PSSCH between the UEs 110-1 and 110-2.

For the sidelink transmission transmitted from the UE 110-2, the UE 110-1 may transmit a sidelink ACK/NACK feedback message to the UE 110-2. In some example embodiments, the UE 110-1 may determine a first transmission occasion for transmitting the feedback message on a first candidate set of code domain resources selected from the at least two candidate sets of code domain resources. Then the UE 110-1 may perform 208 a listen before talk procedure before the first transmission occasion. If the listen before talk procedure is successfully performed, the UE 110-1 may transmit 210 the feedback message on the first candidate set of code domain resources in the first transmission occasion. The UE 110-2 may also determine the first transmission occasion for transmitting the feedback message on a first candidate set of code domain resources and receive the sidelink ACK/NACK feedback message in the first transmission occasion on a first candidate set of code domain resources.

The first set of code domain resources is used to generate a first PSFCH, which is to be transmitted in a first transmission occasion relative to a PSCCH/PSSCH transmission.

For PSSCH-to-HARQ timing, the gNB may configure a parameter K with the unit of slot. The first transmission occasion for PSFCH is determined from K. For a PSSCH transmission with its last symbol in slot n, HARQ feedback is in slot n+a where a is the smallest integer larger than or equal to K with the condition that slot n+a contains PSFCH resources.

Figure 3:
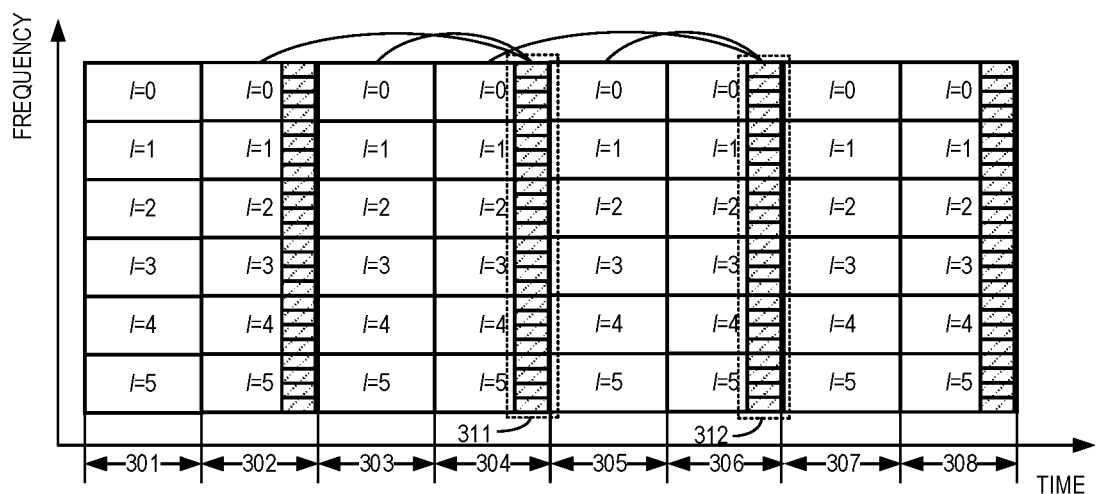
FIG. 3 shows an example of resource mapping for HARQ feedback according to some example embodiments of the present disclosure.

FIG. 3 shows an example of resource mapping for HARQ feedback according to some example embodiments of the present disclosure. For example, as shown in FIG. 3, when K is configured as 1. For PSSCH transmitted in the $2^{nd}$ slot 302 and the $3^{rd}$ slot 303, the first transmission occasion for PSFCH 311 is in the $4^{th}$ slot 304.

Figure 4:
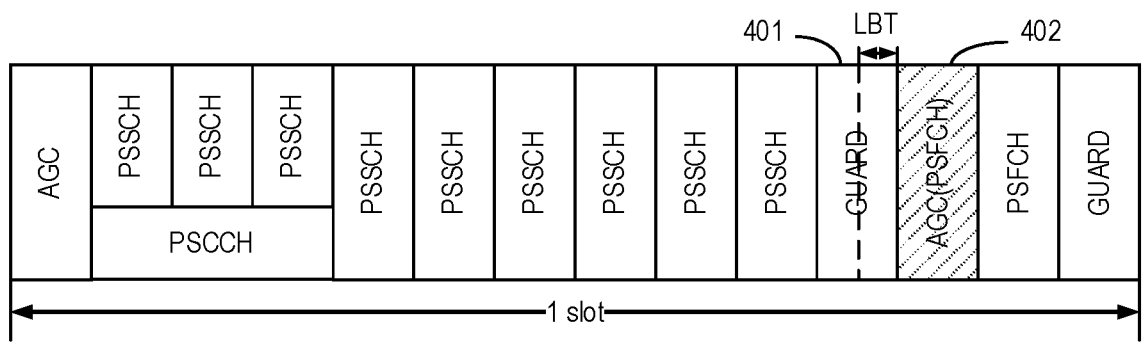
FIG. 4 shows an example of slot format of PSCCH, PSSCH, and PSFCH according to some example embodiments of the present disclosure.

FIG. 4 shows an example of slot format of PSCCH, PSSCH, and PSFCH according to some example embodiments of the present disclosure. The listen before talk procedure performed by the UE 110-1 in a guard symbol 401 before PSFCH symbol 402 in the time-domain is used for 25 us LBT (Cat 2 single-shot LBT) in COT sharing scenario.

Referring back to FIG. 2, if the sidelink ACK/NACK feedback message in the first transmission occasion is not transmitted due to LBT failure in unlicensed spectrum, the UE 110-1 may determine a second transmission occasion for transmitting the feedback message on a second candidate set of code domain resources selected from the at least two candidate sets of code domain resources. Then the UE 110-1 may perform 212 a further listen before talk procedure before the second transmission occasion. The second transmission occasion is after the first transmission occasion.

If the listen before talk procedure is successfully performed, the UE 110-1 may transmit 214 the feedback message on the second candidate set of code domain resources in the second transmission occasion. The UE 110-2 may also determine the second transmission occasion for transmitting the feedback message on a second candidate set of code domain resources and receive the sidelink ACK/NACK feedback message in the second transmission occasion on a second candidate set of code domain resources.

The second set of code domain resource is used to generate a second PSFCH, which is to be transmitted in a second time occasion relative to the same PSCCH/PSSCH transmission. The gNB can configure a (fixed) delay from the PSCCH/PSSCH transmission to the second transmission occasion. Alternatively, the gNB can configure a (fixed) delay from the first transmission occasion to the second transmission occasion.

Referring back to FIG. 3, for example, the delay between the two transmission occasions is configured as 2 slots. For PSSCH transmitted in the $2^{nd}$ slot 302 and the $3^{rd}$ slot 303, the second time occasion for PSFCH 312 is in the $6^{th}$ slot 306.

In some example embodiments, the first PSFCH 311 and the second PSFCH 312 contain the same ACK/NACK information corresponding to the same PSCCH/PSSCH transmission. As shown in FIG. 3, the first PSFCH transmitted in the $4^{th}$ slot 304 with cyclic shifts {0, 6} and the second PSFCH transmitted in in the $6^{th}$ slot 306 with cyclic shifts {3, 9} contain the same ACK/NACK information corresponding to the same PSCCH/PSSCH transmission transmitted in the $2^{nd}$ slot 302 and the $3^{rd}$ slot 303.

In some example embodiments, there is no overlap in the first set of code domain resources and the second set of code domain resources. As shown in FIG. 3, in the $4^{th}$ slot 304, PSFCHs 311 are not able to be transmitted due to LBT failure in unlicensed spectrum. In the $6^{th}$ slot 306, the first PSFCH transmitted with cyclic shifts {0, 6} corresponds to a PSCCH/PSSCH transmission in the 4$^{th}$ slots 304 and 5$^{th}$ slot 305, the second PSFCH transmitted with cyclic shifts {3, 9} corresponds to a PSCCH/PSSCH transmitted in the 2$^{nd}$ slot 302 and the 3$^{rd}$ slot 303. Since there is no overlap in the first set of code domain resources and the second set of code domain resources, the transmitting UE can differentiate HARQ feedbacks corresponding to PSCCHs/PSSCHs transmitted in two slots of (fixed) delay.

At the UE 110-2, if ACK is received, the sidelink transmission from the UE 110-2 to the UE 110-1 is finished. If NACK is received, the UE 110-2 may perform resource reselection for retransmission.

In this way, additional code domain resources may provide more available time occasions as backup resources for HARQ feedback of sidelink transmission in unlicensed band, which may increase reliability of HARQ feedback transmission for sidelink communication in unlicensed spectrum. Hence it can eventually increase spectral efficiency by avoiding unnecessary retransmission of PSCCH/PSSCH, and can also reduce transmission latency in the meantime.

Figure 5:
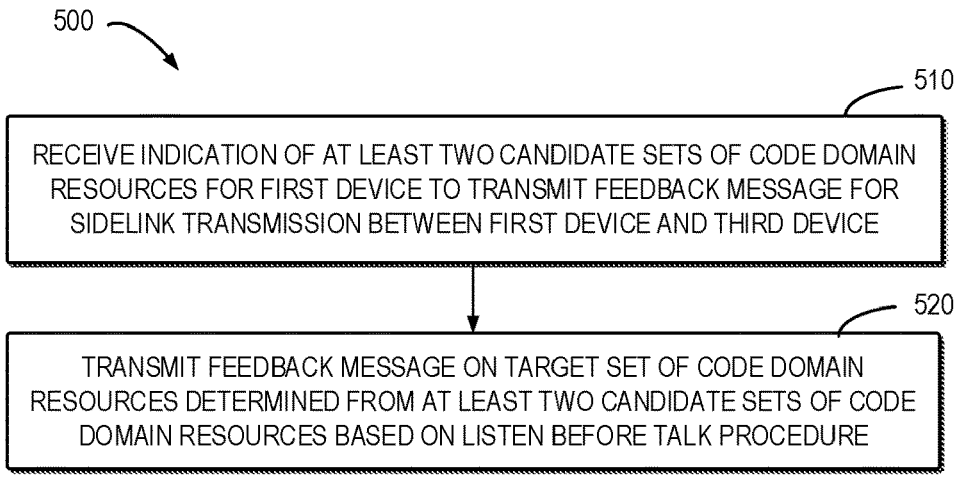
FIG. 5 shows a flowchart of an example method of HARQ for NR sidelink communication in unlicensed spectrum according to some example embodiments of the present disclosure.

FIG. 5 shows a flowchart of an example method 500 of HARQ for NR sidelink communication in unlicensed spectrum according to some example embodiments of the present disclosure. The method 500 can be implemented at the first device 110-1 as shown in FIG. 1. For the purpose of discussion, the method 500 will be described with reference to FIG. 1.

At 510, the first device receives, from a second device, an indication of at least two candidate sets of code domain resources for the first device to transmit a feedback message for a sidelink transmission between the first device and a third device.

In some example embodiments, the indication at least comprises a reference sequence for configuring a reference set of resources for transmitting the feedback message, and a set of cyclic shift values for indicating the feedback message.

At 520, the first device transmit, to the third device, the feedback message on a target set of code domain resources determined from the at least two candidate sets of code domain resources based on a listen before talk procedure.

In some example embodiments, the first device may determine a first transmission occasion for transmitting the feedback message on a first candidate set of code domain resources selected from the at least two candidate sets of code domain resources and perform the listen before talk procedure before the first transmission occasion. If the first device determines the LBT is successful, the first device may transmit the feedback message on the first candidate set of code domain resources in the first transmission occasion.

In some example embodiments, if the first device determines the LBT fails, the first device may determine a second transmission occasion for transmitting the feedback message on a second candidate set of code domain resources selected from the at least two candidate sets of code domain resources, the second candidate set of code domain resources being different from the first candidate set of code domain resources and perform a further listen before talk procedure before the second transmission occasion. If the first device determines the further LBT is successful, the first device may transmit the feedback message on the second candidate set of code domain resources in the second transmission occasion.

Figure 6:
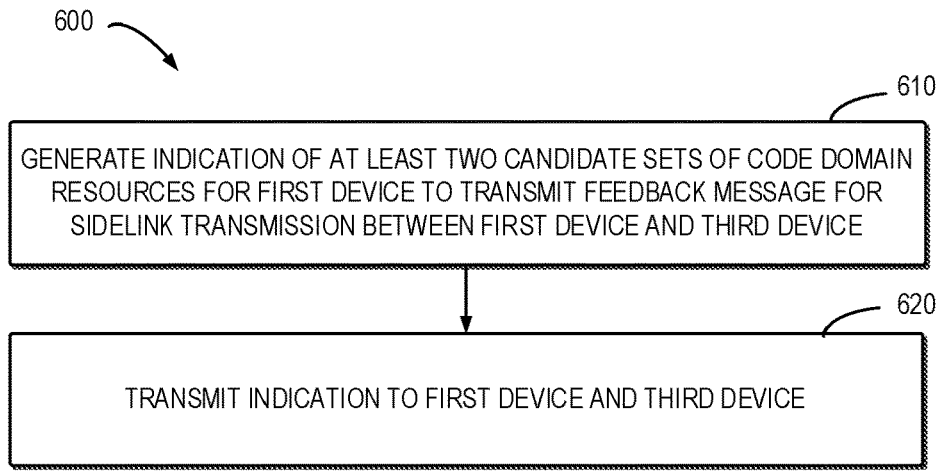
FIG. 6 shows a flowchart of an example method of HARQ for NR sidelink communication in unlicensed spectrum according to some example embodiments of the present disclosure.

FIG. 6 shows a flowchart of an example method 600 of HARQ for NR sidelink communication in unlicensed spectrum according to some example embodiments of the present disclosure. The method 600 can be implemented at the second device 120 as shown in FIG. 1. For the purpose of discussion, the method 600 will be described with reference to FIG. 1.

At 610, the second device generates an indication of at least two candidate sets of code domain resources for a first device to transmit a feedback message for a sidelink transmission between the first device and a third device.

At 620, the second device transmits the indication to the first device and the third device.

Figure 7:
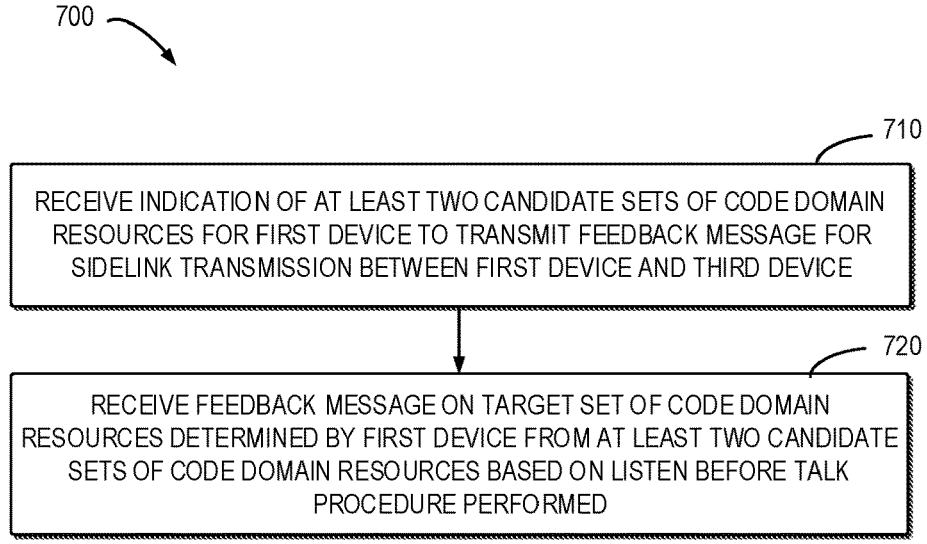
FIG. 7 shows a flowchart of an example method of HARQ for NR sidelink communication in unlicensed spectrum according to some example embodiments of the present disclosure.

FIG. 7 shows a flowchart of an example method 700 of HARQ for NR sidelink communication in unlicensed spectrum according to some example embodiments of the present disclosure. The method 700 can be implemented at the third device 110-2 as shown in FIG. 1. For the purpose of discussion, the method 700 will be described with reference to FIG. 1.

At 710, the third device receives, from a second device, an indication of at least two candidate sets of code domain resources for a first device to transmit a feedback message for a sidelink transmission between the first device and the third device.

At 720, the third device receives, from the first device, the feedback message on a target set of code domain resources determined by the first device from the at least candidate two sets of code domain resources based on a listen before talk procedure.

In some example embodiments, the third device may perform the sidelink transmission to the first device. The third device may further determine a first transmission occasion for transmitting the feedback message on a first candidate set of code domain resources selected from the at least two candidate sets of code domain resources and detect whether the feedback message is transmitted from the first device on the first candidate set of code domain resources in the first transmission occasion. If the third device determines the feedback message transmitted from the first device is detected, the third device receives the feedback message.

If the third device determines the feedback message transmitted from the first device is not detected, the third device may determine a second transmission occasion for transmitting the feedback message on a second candidate set of code domain resources selected from the at least two candidate sets of code domain resources, the second candidate set of code domain resources being different from the first candidate set of code domain resources. If the third device determines the feedback message transmitted from the first device is detected in the second transmission occasion, the third device receives the feedback message.

In some example embodiments, an apparatus capable of performing the method 500 (for example, implemented at the UE 110-1) may comprise means for performing the respective steps of the method 500. The means may be implemented in any suitable form. For example, the means may be implemented in a circuitry or software module.

In some example embodiments, the apparatus comprises means for receiving, from a second device, an indication of at least two candidate sets of code domain resources for the first device to transmit a feedback message for a sidelink transmission between the first device and a third device; and means for transmitting, to the third device, the feedback message on a target set of code domain resources determined from the at least two candidate sets of code domain resources based on a listen before talk procedure.

In some example embodiments, an apparatus capable of performing the method 600 (for example, implemented at the gNB 120) may comprise means for performing the respective steps of the method 600. The means may be implemented in any suitable form. For example, the means may be implemented in a circuitry or software module.

In some example embodiments, the apparatus comprises means for generating an indication of at least two candidate sets of code domain resources for a first device to transmit a feedback message for a sidelink transmission between the first device and a third device; and means for transmitting the indication to the first device and the third device.

In some example embodiments, an apparatus capable of performing the method 700 (for example, implemented at the further UE 110-2) may comprise means for performing the respective steps of the method 700. The means may be implemented in any suitable form. For example, the means may be implemented in a circuitry or software module.

In some example embodiments, the apparatus comprises means for receiving, from a second device, an indication of at least two candidate sets of code domain resources for a first device to transmit a feedback message for a sidelink transmission between the first device and the third device; and means for receiving, from the first device, the feedback message on a target set of code domain resources determined by the first device from the at least candidate two sets of code domain resources based on a listen before talk procedure.

Figure 8:
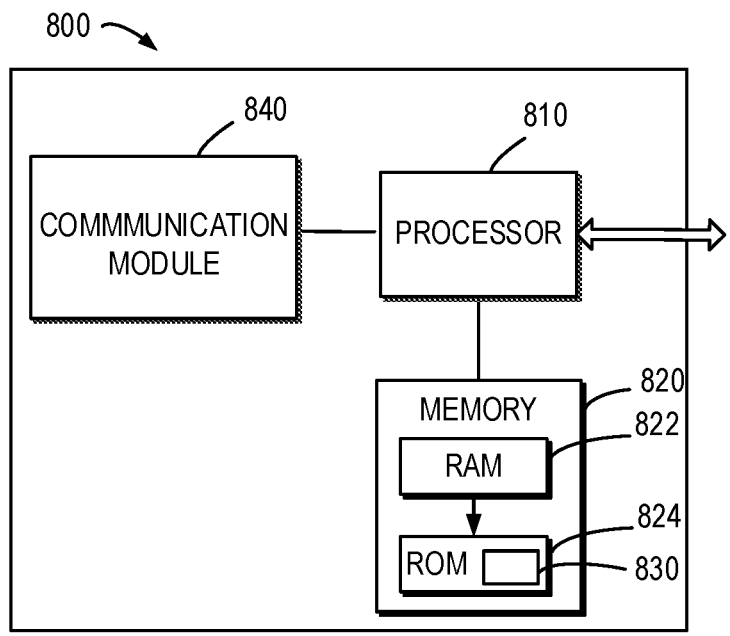
FIG. 8 shows a simplified block diagram of a device that is suitable for implementing example embodiments of the present disclosure.

FIG. 8 is a simplified block diagram of a device 800 that is suitable for implementing embodiments of the present disclosure. The device 800 may be provided to implement the communication device, for example the UE 110-1, the gNB 120 and the further UE 110-2 as shown in FIG. 1. As shown, the device 800 includes one or more processors 810, one or more memories 840 coupled to the processor 810, and one or more transmitters and/or receivers (TX/RX) 840 coupled to the processor 810.

The TX/RX 840 is for bidirectional communications. The TX/RX 840 has at least one antenna to facilitate communication. The communication interface may represent any interface that is necessary for communication with other network elements.

The processor 810 may be of any type suitable to the local technical network and may include one or more of the following: general purpose computers, special purpose computers, microprocessors, digital signal processors (DSPs) and processors based on multicore processor architecture, as non-limiting examples. The device 800 may have multiple processors, such as an application specific integrated circuit chip that is slaved in time to a clock which synchronizes the main processor.

The memory 820 may include one or more non-volatile memories and one or more volatile memories. Examples of the non-volatile memories include, but are not limited to, a Read Only Memory (ROM) 824, an electrically programmable read only memory (EPROM), a flash memory, a hard disk, a compact disc (CD), a digital video disk (DVD), and other magnetic storage and/or optical storage. Examples of the volatile memories include, but are not limited to, a random access memory (RAM) 822 and other volatile memories that will not last in the power-down duration.

A computer program 830 includes computer executable instructions that are executed by the associated processor 810. The program 830 may be stored in the ROM 820. The processor 810 may perform any suitable actions and processing by loading the program 830 into the RAM 820.

The embodiments of the present disclosure may be implemented by means of the program 830 so that the device 800 may perform any process of the disclosure as discussed with reference to FIGS. 2 to 7. The embodiments of the present disclosure may also be implemented by hardware or by a combination of software and hardware.

Figure 9:
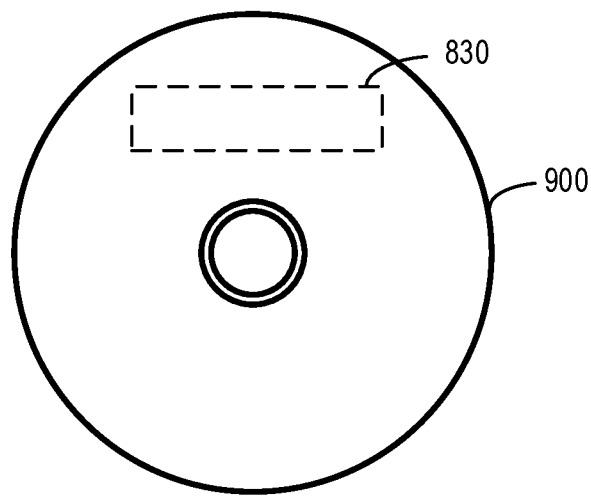
FIG. 9 shows a block diagram of an example computer readable medium in accordance with some embodiments of the present disclosure.

In some embodiments, the program 830 may be tangibly contained in a computer readable medium which may be included in the device 800 (such as in the memory 820) or other storage devices that are accessible by the device 800. The device 800 may load the program 830 from the computer readable medium to the RAM 822 for execution. The computer readable medium may include any types of tangible non-volatile storage, such as ROM, EPROM, a flash memory, a hard disk, CD, DVD, and the like. FIG. 9 shows an example of the computer readable medium 900 in form of CD or DVD. The computer readable medium has the program 830 stored thereon.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, device, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the methods 500-700 as described above with reference to FIGS. 5-7. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing device, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, device or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, device, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A first device comprising:
a terminal device in a sidelink communication;
at least one processor; and
at least one memory including computer program code,
wherein the at least one memory and the computer program code are configured to, with the at least one processor, cause the first device at least to:
receive, from a second device comprising a network device, an indication of at least two candidate sets of code domain resources for the first device to transmit a feedback message for a sidelink transmission between the first device and a third device, wherein the third device comprises a further terminal device in the sidelink communication, wherein the indication at least comprises:
a reference sequence for configuring a reference set of resources for transmitting the feedback message, and
a set of cyclic shift values for indicating the feedback message; and
transmit, to the third device, the feedback message on a target set of code domain resources determined from the at least two candidate sets of code domain resources based on a listen before talk procedure, wherein the at least two candidate sets of code domain resources are realized by employing different cyclic shifts of a base sequence, wherein the base sequence includes a Zadoff-Chu sequence,
wherein the first device is caused to transmit the feedback message by:
determining a first transmission occasion for transmitting the feedback message on a first candidate set of code domain resources selected from the at least two candidate sets of code domain resources;
performing a listen before talk procedure before the first transmission occasion, wherein the listen before talk procedure determines that a channel is available for a number of Clear Channel Assessment (CCA) slots by determining that a measured power of each slot is below a predetermined threshold;
in accordance with a determination that the listen before talk procedure is successful, transmitting the feedback message on the first candidate set of code domain resources in the first transmission occasion;
in accordance with a determination that the listen before talk procedure fails, determine a second transmission occasion for transmitting the feedback message on a second candidate set of code domain resources selected from the at least two candidate sets of code domain resources, the second candidate set of code domain resources being different from the first candidate set of code domain resources;
perform a further listen before talk procedure before the second transmission occasion; and
in accordance with a determination that the further listen before talk procedure is successful, transmit the feedback message on the second candidate set of code domain resources in the second transmission occasion.

* * * * *